(12) United States Patent
Koch et al.

(10) Patent No.: US 7,674,871 B2
(45) Date of Patent: Mar. 9, 2010

(54) FAST CURING POLYDIORGANOSILOXANES

(75) Inventors: Matthias Koch, Duesseldorf (DE);
Thomas Bachon, Duesseldorf (DE);
Andreas Ferencz, Duesseldorf (DE);
Thomas F. Lim, Killingworth, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 276 days.

(21) Appl. No.: 11/588,202

(22) Filed: Oct. 26, 2006

(65) Prior Publication Data
US 2007/0043194 A1 Feb. 22, 2007

Related U.S. Application Data

(63) Continuation of application No. 10/823,969, filed on Apr. 14, 2004, now abandoned.

(51) Int. Cl.
*C08G 77/22* (2006.01)
(52) U.S. Cl. ............... 528/30; 528/34; 528/41; 528/38
(58) Field of Classification Search ............ 528/34, 528/41, 38, 30
See application file for complete search history.

(56) References Cited

U.S. PATENT DOCUMENTS

| | | | |
|---|---|---|---|
| 4,528,081 A | | 7/1985 | Lien et al. |
| 5,432,246 A | | 7/1995 | Fenn et al. |
| 5,457,148 A | | 10/1995 | Lucas |
| 5,670,597 A | * | 9/1997 | Stepp et al. ............ 528/21 |
| 6,018,011 A | * | 1/2000 | Scheim et al. ............ 528/34 |
| 6,627,672 B1 | | 9/2003 | Lin et al. |
| 6,699,918 B2 | | 3/2004 | Ozai et al. |
| 6,743,843 B2 | | 6/2004 | Fujisawa |
| 7,368,519 B2 | * | 5/2008 | Chu ............ 528/34 |
| 2004/0116639 A1 | | 6/2004 | Lim et al. |
| 2004/0181025 A1 | | 9/2004 | Schindler et al. |
| 2004/0236056 A1 | | 11/2004 | Schindler et al. |
| 2006/0148921 A1 | | 7/2006 | Stanjek et al. |

FOREIGN PATENT DOCUMENTS

| | | |
|---|---|---|
| DE | 25 00 020 | 7/1976 |
| EP | 0 545 702 A1 | 6/1993 |
| WO | WO 96/02579 A1 | 2/1996 |
| WO | WO 02/068501 A2 | 9/2002 |
| WO | WO 03/008485 A1 | 1/2003 |
| WO | WO 03/033500 A1 | 4/2003 |
| WO | WO 2004/037868 A1 | 5/2004 |
| WO | WO 2005/100482 A1 | 10/2005 |
| WO | WO 2006/014786 A1 | 2/2006 |

OTHER PUBLICATIONS

Questel-Orbit "Derwent Abstract of WO 05/100482 A1".
"*Photogeneration of Amines from α-Keto Carbamates: Photochemical Studies*", Cameron et al., Journal American Chemical Society, vol. 118, No. 51, (1996) pp. 12925-12937.
"*Photogeneration of amines from α-keto carbametes: design and preparation of photoactive compounds*", Cameron et al., Journal American Chemical Society, Perkin Trans. 1, (1997), pp. 2429-2442.
"*Base Catalysis in Imaging Materials. 1. Design and Synthesis of Novel Light-Sensitive Urethanes as Photoprecursors of Amines*", Cameron et al., Journal American Chemical Society, vol. 55, No. 23, (1990) pp. 5919-5922.
"*Photo-Initiated Base-Formation in a Polymer Matrix*", Ito et al., Journal of Polymer Science, Part A: Polymer Chemistry, vol. 32, pp. 2177-2185 (1994).
"*Photogeneration of Polyfunctional Amines and Novel Thermal Curing Reactions of Epoxy Resin and Polyurethane Oligomers Using these Amines*", Nishikubo et al., Journal of Polymer Science: Part A: Polymer Chemistry, vol. 31, pp. 3013-3020 (1993).
"*Synthesis of Photoreactive Imidazole Derivatives and Thermal Curing Reaction of Epoxy Resins Catalyzed by Photo-Generated Imidazole*", Nishikubo et al., Journal of Polymer Science, vol. 29, No. 5, pp. 450-456 (1997).

* cited by examiner

*Primary Examiner*—Kuo-Liang Peng
(74) *Attorney, Agent, or Firm*—Steven C. Bauman

(57) ABSTRACT

The present invention concerns α-silyl terminated polydiorganosiloxanes, a method of making the α-silyl terminated polydiorganosiloxanes, and sealant compositions containing said compounds and a method of using such sealant compositions.

9 Claims, No Drawings

FAST CURING POLYDIORGANOSILOXANES

CROSS REFERENCE TO RELATED APPLICATIONS

This application is a continuation under 35 U.S.C. §365(c) of prior U.S. application Ser. No. 10/823,969, filed Apr. 14, 2004 now abandoned.

FIELD OF THE INVENTION

This invention relates to polydiorganosiloxanes, a method of producing the same, sealant compositions containing the polydiorganosiloxanes of the invention and a method of using such sealant compositions.

BRIEF DESCRIPTION OF THE RELATED ART

In the synthesis of room-temperature-vulcanizing sealants (RTV sealants) based on silicones, so-called silanol terminated polydiorganosiloxanes, are widely used as initial compounds.

Generally, RTV sealants based on silicone are created in two steps. First the silanol terminated polydiorganosiloxanes are reacted with a multifunctional silane, whereby the silanol end group is substantially displaced by the multifunctional silane. In a second step the resultant silane terminated polyorganosiloxane is exposed to moisture to be hydrolyzed and condensed to form cross-linked sealants.

Most commonly used systems rely on the presence of acetoxy, enoxy, oxime, methoxy and amine functionalized silanes for coupling with the silanol terminated polydiorganosiloxane in the above mentioned first step. Those systems release acetic acid, acetone, oximes, methanol and amines, respectively, upon hydrolysis in the above mentioned second step. Besides the toxic character of some of the released compounds, like methanol, various oximes and amines, some compounds like amines and acetic acid possess an offensive smell.

Acetoxy systems in general rely on tin catalysts. The tin level of those systems is at least 50 ppm, typically even up to ten times higher. Since the use of organometallic compounds conflicts with recent environmental efforts, such compounds should essentially be avoided where possible.

Moreover, prior art methoxy γ-silane based RTV systems are to be catalyzed by titanates, tin compounds and/or other organometallic compounds, which are highly questionable for environmental reasons. Even taking into account the use of organometallic compounds, using ethoxy γ-silanes instead of methoxy silanes to release ethanol instead of methanol during moisture catalyzed hydrolysis is not practicable either. This is because ethoxy γ-silane based RTV systems lack reactivity and are therefore disadvantageous regarding skin-over-time, tack-free-time and vulcanization rate.

Reactivity of alkoxy silanes is not only limited to methoxy derivatives but to the trimethoxy derivatives, which is due to the reduced reactivity of the dialkoxy analogues. Therefore prior art alkoxy silane coupled silicones are obtained by the reaction of silanol terminated polydiorganosiloxanes with trimethoxy γ-silanes. Since dialkoxy derivatives are not suitable, only cross-linking between such alkoxysilane terminated polydiorganosiloxanes can occur and a regulatory mere chain-extension by use of dialkoxy derivatives instead of trialkoxy derivatives is not possible.

U.S. Pat. No. 5,457,148 (Lucas et al.) describes an RTV vulcanizable silicone rubber composition and process for the manufacture thereof having a good application rate and good thixotropy, which comprises a polyalkoxy terminated polydimethylsiloxane and a low viscosity silanol stopped polydimethylsiloxane, whereby the composition contains significant amounts of an organo tin catalyst, which are to be avoided in the present invention.

Published international Pat. Appl. No. WO 03/008485 (Schindler et al.) describes compositions usable as joint compounds on silicone basis, eliminating alcohols while cross-linking to elastomers takes place. Those compounds are synthesized from silanol terminated polydiorganosiloxanes, isocyanato silanes and silazanes, whereby the employed silanes are limited to isocyanato silanes due to the coupling mechanism—urea bond formation by reaction with silazanes—to the silanol groups. The compositions used in the examples contain significant amounts of tin compounds and skin-over-times are 15 min or more.

Accordingly, besides overcoming the drawbacks of the above mentioned prior art sealants, the objects and advantages of the present invention are:

(a) to reduce the use of RTV silicone sealant systems containing or releasing toxic and/or environmentally questionable compounds;

(b) to provide RTV silicone sealants possessing fast curing speeds, thus minimizing curing time and enabling soonest possible use of the facilities sealed; and (c) to provide RTV silicone sealants which are customizable to comply with different curing conditions, like moisture, curing time and the like, to provide sealants with adjustable skin-over-times, tack-free-times and vulcanization rates.

Still further objects and advantages will become apparent from a consideration of the ensuing description.

SUMMARY OF THE INVENTION

In a first embodiment, the present invention is directed to an α-silyl terminated polydiorganosiloxane having the following general formula (I):

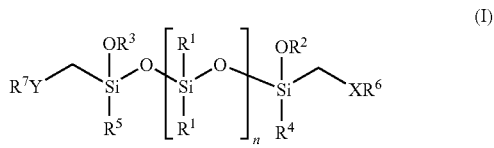

(I)

wherein the radicals $R^1$ correspond to a straight-chain or branched aliphatic radical; a cycloaliphatic radical; an aryl radical; an aralkyl radical; each radical $R^1$ containing 1 to 12 carbon atoms; each radical $R^1$ optionally containing one or more heteroatoms and optionally being substituted with halogen; the radicals $R^1$ being identical or different within the polydiorganosiloxane;

the radicals $R^2$ and $R^3$, which are identical or different, correspond to a straight-chain or branched aliphatic radical;

the radicals $R^4$ and $R^5$, which are identical or different, correspond to a straight-chain or branched aliphatic radical; or correspond to $OR^2$ and $OR^3$, wherein $R^2$ and $R^3$ are defined as above;

the radicals X and Y, which are identical or different, correspond to O, S, N, $PR^8$ or $NR^8$, wherein $R^8$ corresponds to H, $R^9$, a radical —(C=O)NH— $R^9$, —(C=O)—$R^9$ or —($SO_2$)—$R^9$, wherein R⁹ corresponds to an aliphatic or cycloaliphatic radical; an aryl radical; each radical R⁹ containing 1 to 12 carbon atoms; and each radical R⁹ optionally containing one or more heteroatoms;

the radicals R⁶ and R⁷, which are identical or different, correspond to a straight-chain or branched aliphatic radical with 1 to 12 carbon atoms; a cycloaliphatic radical, optionally containing one or more heteroatoms; an aryl radical, optionally containing one or more heteroatoms; the =C=O radical; or —(C=O)R¹⁰, wherein
  R¹⁰ corresponds to a straight-chain or branched aliphatic radical with 1 to 12 carbon atoms; an Z—R¹¹ radical, wherein
    Z corresponds to S, O, PR⁸ or NH and
    R¹¹ corresponds to a straight-chain or branched aliphatic radical with 1 to 12 carbon atoms;

n being from 10 to 10000 or salts of organic acids, inorganic acids or quaternization products thereof.

In a second embodiment, the present invention provides a method of making an α-silyl terminated polydiorganosiloxane or mixtures thereof, comprising:

(A) a first step of adding one or more α-silanes of general formula (II):

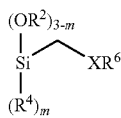

m = 0 or 1 wherein R², R⁴, and R⁶ are defined as above and X=O, S, PR⁸, N, NH or NR⁸, R⁸ being defined as above;
to one or more silanol terminated polydiorganosiloxanes of general formula (III):

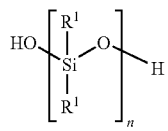

n = 10 to 10000 wherein R¹ is defined as above,
to react both silanol groups; and optionally,
if X=NH (B) a second step, wherein one or more compounds selected from the group consisting of R⁹NCO, R⁹(CO)Cl, R⁹COOH, (R⁹CO)₂O, R⁹SO₂Cl and alkylating agents such as alkyl iodide are added to achieve a complete or partial reaction between the X radical of the product obtained in step (A) and the selected compound or compounds.

In an alternative method, if X=the NH radical, a partial or complete reaction of the compound according to general formula (II) with one or more of the compounds listed under step (B) can be carried out prior to the reaction with the compound according to general formula (III). In some cases using this alternative method it is desired to add an additional basic catalyst, like butyl lithium or lithium alkoxides, lithium hydroxide, potassium or sodium compounds (whereas lithium is replaced with potassium or sodium in the above mentioned compounds) or Lewis bases.

In a fourth embodiment, the present invention is directed to a sealant composition, comprising the α-silyl terminated polydiorganosiloxane of the invention.

A fifth embodiment of the invention is directed to a method of applying the sealant composition of the invention, comprising a first step of applying the sealant to a substrate to be sealed, a second step of exposing the sealant to moisture and an optional third step of activating a photolatent base contained in the sealant composition by irradiation.

DETAILED DESCRIPTION

In a preferred embodiment of the α-silyl terminated polydiorganosiloxane of the invention the radicals R¹ correspond to a straight-chain or branched alkyl radical with 1 to 8 carbon atoms, like methyl, ethyl, n-propyl, iso-propyl, n-butyl, iso-butyl, tert.-butyl and the like. A widely used alkyl radical in silicones is e.g. methyl. Optionally such radicals can contain heteroatoms like oxygen, sulfur or nitrogen, such as an alkoxyalkylene radical, for example. The radicals R¹ can optionally further contain halogen, like chlorine or fluorine instead of hydrogen atoms, e.g. in radicals like the perfluoropropylene radical.

Other possible radicals R¹ are aryl radicals, whereby 5-membered and 6-membered aryl radicals, like phenyl, are preferred. Optionally those residues may contain heteroatoms, like oxygen, sulfur or nitrogen. Optionally halogen atoms are substituted for hydrogen atoms.

In a further embodiment of the invention the radicals R¹ along the n Si(R¹)₂—O-unit containing polydiorganosiloxane chain can be identical, like e.g. in a polydimethylsiloxane chain; or different, like e.g. in a polytrifluoropropylmethylsiloxane chain, wherein some of the methyl groups of a polydimethylsiloxane chain are substituted by —CH₂—CH₂—CF₃ radicals or in a poly(diphenylsiloxane/dimethylsiloxane) copolymer chain, wherein some of the Si(CH₃)₂—O-units are replaced by Si(phenyl)₂-O-units.

In general all radicals R¹ are independent from each other in structure or number along the polydiorganosiloxane chain.

The most common radical R¹ in view of commercial availability of silanol terminated polyorganosiloxanes is methyl.

The radicals R² and R³, which are identical or different, preferably correspond to a straight-chain or branched alkyl radical with 1 to 8 carbon atoms. In view of the above environmental statements and toxicity reasons the ethyl radical is preferred over the methyl radical. Nevertheless where reactivity of such groups in cross-linking is the crucial factor, the employment of methyl groups might be considered, since reactivity slows down as the chain length of the alkyl group increases.

The radicals R⁴ and R⁵, which are identical or different, preferably correspond to a straight-chain or branched alkyl radical with 1 to 8 carbon atoms or the OR² and OR³ radicals, wherein R² and R³ have the above meaning.

In case one or more of R⁴ or R⁵ denote alkyl radicals, cross-linking is reduced compared to the case where one or both of R⁴ and R⁵ correspond to OR² and OR³ radicals. The number of OR² and/or OR³ radicals within one α-silyl terminated polydiorganosiloxane is determined by the α-silane used as reaction partner with the silanol terminated polyorganosiloxane. In case the only α-silanes are trialkoxy α-silanes the resulting α-silyl terminated polydiorganosiloxane will carry a maximum of 4 OR² and/or OR³ radicals. In case the only α-silanes are dialkoxy α-silanes the resulting α-silyl terminated polydiorganosiloxane will carry a maximum of 2 $OR^2$ and/or $OR^3$ radicals. Nevertheless, if a mixture of dialkoxyl α-silanes and trialkoxy α-silanes is employed any number of $OR^2$ and/or $OR^3$ radicals between 2 and 4 can be adjusted depending on the ratio between dialkoxyl α-silanes and trialkoxy α-silanes and their reactivity. Generally trialkoxy α-silanes are more reactive compared to dialkoxy α-silanes. Nevertheless their reactivity is also influenced by the $XR^6$ or $YR^7$ groups, which will be discussed below and the nature of the $R^2$ and $R^3$ groups which was discussed above.

The radicals X and Y, which are identical or different, correspond to O, S, N or $NR^8$, wherein $R^8$ corresponds to H, $R^9$, a radical —(C═O)NH—$R^9$, —(C═O)—$R^9$ or —(SO$_2$)—$R^9$, wherein $R^9$ preferably corresponds to an alkyl or cycloalkyl radical with 1 to 8 carbon atoms, a 5-membered or a 6-membered aryl radical optionally containing heteroatoms. In view of a high cross-linking activity, resulting in low skin-over-times and tack-free-times as well as high vulcanization rates, it is preferred that X and/or Y are NH, which is a radical suitable to auto-catalyze the cross-linking between the α-silyl terminated polydiorganosiloxanes, due to the basic character of the NH radical.

Moreover, the NH radical-containing α-silanes are also advantageous in view of the reaction with silanol terminated polydiorganosiloxanes, since the basic character of this group typically makes the employment of catalysts unnecessary.

Further, the α-silyl terminated polydiorganosiloxanes carrying the NH radical as radical X and/or Y can not only be used for sealant purposes as such, but can serve as precursors in a further reaction with isocyanates of the general formula $R^9$—NCO, or acid halides of the general formula $R^9$—CO-Hal, anhydrides (($R^9$CO)$_2$O), or $R^9$—SO$_2$Hal, wherein $R^9$ corresponds to an aliphatic radical, an aryl radical, each radical $R^9$ containing 1 to 12 carbon atoms and each radical $R^9$ optionally containing one or more heteroatoms, whereby $R^9$ preferably corresponds to an alkyl radical with 1 to 8 carbon atoms, a 5-membered or a 6-membered aryl radical optionally containing one or more heteroatoms; and Hal corresponds to an halogen atom, like chlorine.

The α-silyl terminated polydiorganosiloxanes carrying the NH radical as radical X and/or Y can partially or completely be reacted with the isocyanate of the general formula $R^9$—NCO, e.g. phenylisocyanate, cyclohexylisocyanate, isopropylisocyanate, or with an acid halide of the general formula $R^9$—COHal, e.g. benzoylchloride. This reaction leads to the products wherein X and/or Y are $NR^8$, $R^8$ being defined as above. Due to the complete or partial loss of NH radicals caused by the reaction with the isocyanate or acid halide, the basic character is partially lost and reactivity is decreased. This optional reaction is therefore suitable to customize the α-silyl terminated polydiorganosiloxanes of the invention with respect to curing times (skin-over-time, tack-free-time) and vulcanization rates expected by the skilled sealant user.

Instead of the above mentioned reactions, salts of inorganic acids, like sulfuric acid, hydrochloric acid or organic acids, like benzoic acid, which additionally serves as preservative, terephthalic acid, phthalic acid, caproic acid, fatty acids (like stearic acid), ascorbic acid, or tartaric acid can be formed, to modulate the basic character of the NH-containing silyl radicals as desired.

A further possibility to modulate the basicity of the NH-containing silyl radicals is to carry out a quaternization reaction of the NH radical, e.g. with a reactive alkyl halide, like methyl iodide.

The radicals $R^6$ and $R^7$, which can be same or different, preferably correspond to a straight-chain or branched alkyl radical with 1 to 8 carbon atoms, like methyl, ethyl, n-propyl, iso-propyl, n-butyl, iso-butyl or tert.-butyl radicals; a 5-membered or 6-membered cycloalkyl radical, like cyclopentyl or cyclohexyl, which optionally may contain one or more heteroatoms, like in the morpholino radical and which optionally may contain double bonds; a 5-membered or 6-membered aryl radical, like the phenyl radical, which optionally may contain one or more heteroatoms; or the ═C═O radical. The radicals $R^6$ and/or $R^7$ can also denote the radical —(C═O)$R^{10}$, wherein $R^{10}$ corresponds to a straight-chain or branched alkyl radical with 1 to 8 carbon atoms; a straight-chain or branched alkylene radical with 1 to 8 carbon atoms, like the —C(CH$_3$)═CH$_2$ radical; a Z—$R^{11}$ radical, wherein Z corresponds to S, O or NH and $R^{11}$ corresponds to a straight-chain or branched alkyl radical with 1 to 8 carbon atoms, like methyl, ethyl, n-propyl, iso-propyl, n-butyl, iso-butyl or tert.-butyl radicals.

The number of n in general formula (I) typically influences the viscosity of the resultant sealant. The general range for n is 10 to 10000. Suitable viscosities of the α-silyl terminated polydiorganosiloxanes of the invention can e.g. range from about 1,000 to about 900,000 mPa·s (according to Brookfield: Brookfield RVT, 23° C., Spindle No. 7, 2.5 rpm).

In another embodiment the present invention provides a method of making α-silyl terminated polydiorganosiloxanes or mixtures thereof, comprising (A) a first step of adding one or more α-silanes of general formula (II):

m = 0 or 1 wherein $R^2$, $R^4$ and $R^6$ are defined as above and X═O, S, $PR^8$, N, NH or $NR^8$ to one or more silanol terminated polydiorganosiloxanes of general formula (III):

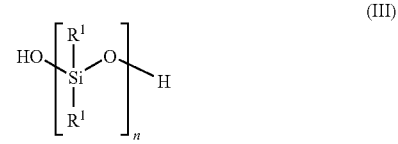

n = 10 to 10000 wherein $R^1$ is defined as above,
to react both silanol groups; and optionally
if X═NH
(B) a second step, wherein a compound selected from the group consisting of $R^9$NCO, $R^9$(CO)Cl, $R^9$COOH, $R^9$SO$_2$Cl, ($R^9$CO)$_2$O, and alkylating agents such as alkyl iodide is added to completely or partially react with the X radical of the product obtained in step (A).

Suitable α-silanes of formula (II) are e.g. (N-cyclohexylaminomethyl)methyl-diethoxysilane, (N-cyclohexylaminomethyl)triethoxysilane, (N-phenylaminomethyl)methyldimethoxysilane, (N-phenylaminomethyl)trimethoxysilane, (methacryloxymethyl)

methyldimethoxysilane, (methacryloxymethyl)trimethoxysilane, (methacryloxymethyl)methyldiethoxysilane, (methacryloxymethyl)triethoxysilane, (isocyanatomethyl)methyldimethoxysilane, (isocyanatomethyl)trimethoxysilane, N-(morpholinomethyl)trimethoxysilane, N-(morpholinomethyl)triethoxysilan, N-(dimethoxymethylsilylmethyl)-O-methylcarbamate, or N-(trimethoxysilylmethyl)-O-methylcarbamate. Those products are e.g. commercially available from Wacker, Burghausen, Germany under the tradename series GENIOSIL® XL.

Stoichiometrically two α-silanes of formula (II) react with one silanol terminated polydiorganosiloxane, which possesses two —OH end groups. Preferably the α-silanes of formula (II) are added in excess, whereby a stoichiometric excess of greater than 1 up to 4 is more preferable and a stoichiometric excess of 2 to 3 is most preferable, to ensure complete reaction of the silanol groups and to reduce cross-linking reactions.

If step (B) is not carried out, e.g. in case X=O or S; or $XR^6$=NCO, a catalyst is preferably added. A suitable catalyst is according to EP 564253 butyl lithium.

If step (B) is not carried out because a product wherein X=NH is desired, the catalyst is preferably omitted, nevertheless the addition of a catalyst does not interfere with the reaction either.

The reactions are usually carried out at temperatures from 0 to 120° C., preferably 20 to 40° C.

Any of the above α-silyl terminated polydiorganosiloxanes according to formula (I) or mixtures thereof or reaction products obtained by the methods of making α-silyl terminated polydiorganosiloxanes of the invention are suitable as sealant components.

Therefore another embodiment of the present invention provides sealant compositions, comprising one or more α-silyl terminated polydiorganosiloxanes according to the invention.

The content of α-silyl terminated polydiorganosiloxanes within the sealant compositions of the invention typically varies between 10 and 95% by weight based on the weight of the total composition. Preferably their content is in the range of 40 to 80% by weight.

Typically such sealant compositions comprise further additives, like water scavengers, fillers, plasticizers, adhesion promoters, photosensitizers, pigments and other standard supplementary agents. Since the α-silyl terminated polydiorganosiloxanes of the invention are highly reactive and moisture sensitive, those additives are preferably mixed with the α-silyl terminated polydiorganosiloxanes of the invention in a bone-dry (anhydrous) state to prevent interference with storage stability and to prevent premature vulcanization.

Typical water scavengers are e.g. vinyltrimethoxysilane, vinyltripropenoxysilane, carbamatomethylsilanes, tetraethoxysilane, hexamethyldisilanzane, acetoxysilanes, or isocyanates.

Typical fillers in sealant compositions are e.g., silica, carbon black, metal oxides, like titanium dioxide, ferric oxide, aluminum oxide, zinc oxide, quartz, calcium carbonate clay, zirconium silicate, gypsum, silicium nitride, boron nitride, barium sulfate, zeolite, glass and plastic powder.

Plasticizers in sealant compositions in general comprise compounds like trimethylsilyl terminated polydimethylsiloxanes or organic esters or mineralic oils.

Typical adhesion promoters are e.g. 3-aminopropyltriethoxysilane, 3-aminopropyltrimethoxysilane, 3-aminopropylmethyldiethoxysilane, 3-aminopropylmethyldimethoxysilane, methylaminopropyltrimethoxysilane, 1,3,5-tris(trimethylsilylpropyl)isocyanurate, 3-glycidoxypropyltrimethoxysilane, 3-glycidoxypropylethyldimethoxysilane, 2-glycidoxyethyltrimethoxysilane, 2-cyanoethyltrimethoxysilane, 3-cyanopropyltriethoxysilane, isocyanatopropyltriethoxysilane, isocyanatopropyltrimethoxysilane, or mixtures thereof.

Further the α-homologues of the herein before mentioned γ-silanes are suitable adhesion promoters. Moreover titanium organic compounds, like tetraalkoxytitanates, or organophosphorus compounds are suitable adhesion promoters and known to the one skilled in the art of the field of invention.

Other supplementary agents e.g. comprise soluble dyes, inorganic and organic pigments, anti-oxidants, flame-retardants, UV-stabilizers, biocides, like fungicides, thermal stabilizing agents, rheological additives, and tackifiers.

In case the α-silyl terminated polydiorganosiloxane contained in the sealant composition does not already contain an auto-catalyzing basic nitrogen radical, like NH or other basic radicals, a cross-linking catalyst is preferably added to the composition. Upon exposure to moisture, e.g. ambient humidity, the auto-catalyzing sealant composition or the sealant composition to which a catalyst was added, will in general start vulcanizing. Nevertheless it is also possible to add one or more photolatent bases, as e.g. o-nitrobenzyloxicarbonylamine, benzoincarbamate, α,α-dimethylbenzoyloxycarbonylamine, formanilid-derivatives, O-acyloxime, photolatent diazabicyclo[4.3.0]non-5-ene (PL-DBN) or PL-tertiary amines or amidines as catalysts and to start vulcanization upon irradiation of such photolatent base containing sealants subsequent to their application. Due to irradiation the free base will be created within the sealant composition from the photolatent base and vulcanization will start.

Another embodiment of the invention is therefore directed to a method of applying the sealant composition of the invention, comprising a first step of applying the sealant to a substrate to be sealed, a second step of exposing the sealant to moisture and an optional third step of activating a photolatent base contained in the sealant composition by irradiation.

Typical substrates for RTV silicone based sealants comprise e.g. metals, e.g. aluminum, iron, magnesium, copper, chrome, alloys thereof, and the like, polymers, e.g. polyacrylates, polymethacrylates, polyvinylchlorides, polycarbonates and the like, ceramics, tiles, glass, marble, concrete, granite, sandstone, limestone and wood.

In general it is preferred that the ambient humidity is above 30% of relative humidity to ensure a fast curing of the sealants.

In case photolatent bases are used as crosslinking catalysts, any photolatent bases possessing suitable basicity are applicable. Besides the well-known photolatent bases as described by Cameron et al. in J. Am. Chem. Soc. 118 (1996) 12925, J. Chem. Soc. Perkin Trans. I (1997) 2429 and J. Org. Chem. 55 (1990) 5919, by Nishikubo et al. in Polym. J. 29 (1997) 450 and Polym. J. 25 (1993) 365, as well as Ito et al. in J. Poly. Sci. Part A: Polym. Chem. 32 (1994) 2177, a new generation of photolatent bases has been described by CIBA, Basel, Switzerland (WO 03/033500). Prominent species of those photolatent bases are e.g. photolatent diazabicyclononanes, in particular 5-benzyl-1,5-diazabicyclo[4.3.0]nonane, wherein the 5-benzyl residue may be substituted by one or more substituents. Suitable substituents at the 5-benzyl residue are halide, like chlorine or bromine, alkyl residues, like methyl, ethyl or propyl, nitril residues, nitro groups, alkoxy groups like methoxy or ethoxy groups or aromatic residues which are condensed to the 5-benzyl residue, as e.g. a 5-(naphth-2-ylmethyl) residue or a 5-(anthracen-9-yl-methyl) residue derived from a 5-(benzyl) residue. It is also possible to introduce a 5-(anthrachinon-2-yl-methyl) residue instead of the 5-benzyl residue. Besides such substitutions at the 5-benzyl residue it is also possible to further substitute the diazacyclononane residue to get photolatent bases like 5-benzyl-2-methyl-1,5-diazabicyclo[4.3.0]nonane.

Besides the photolatent diazabicyclononanes it is also possible to use photolatent diazabicycloundecanes, like for example 8-benzyl-1,8-diazabicyclo[5.4.0]undecanes and its derivatives. The 8-benzyl residue can be substituted in the same way as shown for the 5-benzyl residue in 5-benzyl-1,5-diazabicyclo[4.3.0]nonane. Further substitution at the diazabicyclononane residue is likewise possible.

It is also possible to use photolatent bases comprising two releasable bases within one molecule. An example for such compounds is 1,4-bis(1,5-diazabicyclo[4.3.0]nonanylmethyl)benzene. In case photolatent bases are used in the compositions of the present invention it is preferable to add photosensitizers to the composition. It is further preferable to use one or more substituted or unsubstituted benzophenones, thioxanthones, anthrachinones, 3-acylcoumarines or dyes like oxacines, acridines, phenacines and rodamines as photosensitizers.

Compositions containing photolatent bases require irradiation to liberate or release the free base. The irradiation wavelength used to cause formation of the free base can be varied over a wide range, ranging from the UV region through the visible region into the infrared region, depending on the photolatent base. Most preferably wave lengths ranging from about 200 to about 700 nm will be used. Suitable radiation comprises, for example, sunlight or light from artificial light sources. Both point sources and flat radiators are suitable. Examples are carbon arc lamps, xenon arc lamps, medium-pressure, high-pressure and low-pressure mercury lamps, doped if desired with metal halides (metal halogen lamps), microwave-stimulated metal vapour lamps, excimer lamps, superactinic fluorescent tubes, fluorescent lamps, incandescent argon lamps, electronic flashlights, xenon flashlights, photographic flood lamps, electron beams and X-rays, produced by means of synchrotrons or laser plasma. The distance between the lamp and the substrate preferably range from about 1 cm to about 2 m, but depends on the light source and the sensitivity of the photolatent bases as well as the presence or absence of further photosensitizers.

EXAMPLES

Preparation Examples

Example 1

Preparation of a Fast Cure Silicone RTV Sealant 80 g of silanol terminated polydimethylsiloxane (molecular weight of approximately 32,000 g/mol; n—as defined above—is approximately 430) is de-aerated for 10 min at room temperature under vacuum. 0.01 g of n-butyl lithium (1.6M solution in hexane) is added as catalyst. The resultant mixture is mixed under $N_2$ for 2 min (mixer: model PLM 5, obtained from Premier Mill Corp., Reading, Pa., U.S.A.). A mixture of 2.03 g of N-(trimethoxysilylmethyl)-O-methylcarbamate and 0.67 g of N-(cyclohexylaminomethyl)-triethoxysilane is added, and the resultant mixture is mixed under vacuum for 60 min at room temperature. 10.81 g of trimethylsiloxy terminated polydimethylsiloxane (Dow Corning 200®, Fluid, 1000 CST.) is added as a plasticizer. After mixing for 5 min, 6.30 g silica (Aerosil® 974, obtained from Degussa, Germany) is added.

The resultant mixture is mixed at low blade-speed until the silica is wetted in, and then the mixing continues at a higher blade-speed for 15 min to disperse the silica further.

0.18 g hexamethydisilazane is added and the resultant mixture is mixed under vacuum for 15 min. The resultant mixture is a ready-to-use sealant.

The resultant sealant was tested with respect to its vulcanization rate and skin-over-time at 23° C. and 50% relative humidity. The results are shown in Table 1.

Example 2

Preparation of a Fast Cure Silicone RTV Sealant 85.23 g of silanol terminated polydimethylsiloxane (molecular weight of approximately 32,000 g/mol) is de-aerated for 10 min at room temperature under vacuum. A mixture of 1.52 g of N-(cyclohexylaminomethyl)-methyldiethoxysilan and 1.70 g of N-(cyclohexylaminomethyl)-triethoxysilane is added under stirring. The resultant mixture is mixed under vacuum for 60 min at room temperature. Afterwards 7.22 g silica (Aerosil® R 974, obtained from Degussa, Germany) is added in small portions. The mixture is mixed at high speed under nitrogen atmosphere for 15 min. 0.21 g hexamethydisilazane and 1.03 g of γ-aminopropyltriethoxysilane are mixed in. Subsequently 2.06 g of zinc oxide and 1.03 g of titanium dioxide are added. The resultant mixture is stirred under vacuum for 15 min to become a ready-to-use sealant.

The resultant sealant was tested with respect to its vulcanization rate and skin-over-time at 23° C. and 50% relative humidity. The results are shown in Table 1.

Example 3

Preparation of a Fast Cure Silicone RTV Sealant 88.63 g of silanol terminated polydimethylsiloxane (molecular weight of approximately 32,000 g/mol) is de-aerated for 10 min at room temperature under vacuum. 0.01 g of n-butyl lithium (1.6M solution in hexane) is added as catalyst. The resultant mixture is mixed under $N_2$ for 2 min. A mixture of 0.64 g of N-(cyclohexylaminomethyl)-methyldiethoxysilan and 2.96 g of N-(cyclohexylaminomethyl)-triethoxysilane is added, and the resultant mixture is mixed under vacuum for 30 min at room temperature in order to complete the end-capping. 0.56 g of phenylisocyanate is added and the mixture is mixed for 15 min at room temperature under vacuum. The progress of the reaction is controlled by IR spectroscopy. After completion of the reaction 7.00 g of silica (Aerosil® R 974, obtained from Degussa, Germany) is added whereby the mixture is mixed at low blade-speed. Afterwards the formulation is mixed with high blade-speed under nitrogen atmosphere for 15 min in order to disperse the silica homogenously. 0.20 g hexamethydisilazane is added and the resultant mixture is mixed under vacuum for 15 min. The resultant mixture is a ready-to-use sealant.

The resultant sealant was tested with respect to its vulcanization rate and skin-over-time at 23° C. and 50% relative humidity. The results are shown in Table 1.

Comparative Example

Commercial Available Sealant

Commercially available ready-to-use, fast curing silicone sealant available from Rhodia, Leverkusen, Germany under the tradename "ELCH" sealant. This sealant releases acetic acid while cross-linking occurs.

The sealant was tested with respect to its vulcanization rate and skin-over-time at 23° C. and 50% relative humidity. The results are shown in Table 1.

TABLE 1

|  | Example 1 | Example 2 | Example 3 | Comparative Example |
|---|---|---|---|---|
| skin-over-time [min] | 5 | 3 | 7.5 | 6 |
| vulcanization rate [mm/2 h] | 0.84 | 0.83 | 0.73 | 0.25 |
| vulcanization rate [mm/d] | 4.8 | 4.6 | 4.5 | 3.7 |

Examples 4 to 8

Preparation of Silicone RTV Sealants Customized in Skin-Over-Time and Tack-Free-Time 40 g of silanol terminated polydimethylsiloxane (molecular weight of approximately 32,000 g/mol) is de-aerated for 10 min at room temperature under vacuum and mixed with 1.65 g of N-(cyclohexylaminomethyl)-triethoxysilane. The resultant mixture is mixed under nitrogen atmosphere for 15 min at room temperature. Afterwards phenylisocyanate (PIC) is added (Example 4: 0.00 g PIC; Example 5: 0.18 g PIC; Example 6: 0.36 g PIC; Example 7: 0.54 g PIC; and Example 8: 0.72 g PIC). The resultant reaction mixture is further mixed under nitrogen atmosphere at room temperature until no isocyanate absorption was detectable in an infrared spectrum. The different amounts of PIC added allowed different degrees of conversion of the basic nitrogen atom in the terminal N-cyclohexylaminomethyl radicals to urea groups. The conversion was 0% for Example 4, 25% for Example 5, 50% for Example 6, 75% for Example 7 and 100% for Example 8 based on the total silane content.

The resultant RTV silicone sealant mixtures were tested regarding their skin-over-time and tack-free-time at 23° C. and 50% relative humidity. The respective results are given in Table 2.

TABLE 2

|  | Example 4 | Example 5 | Example 6 | Example 7 | Example 8 |
|---|---|---|---|---|---|
| skin-over-time [min] | 3.5 | 5 | 10 | 12 | >480 |
| tack-free-time [min] | 19 | 34 | 73 | >480 | >1440 |

The results shown in Table 2 clearly demonstrate that a conversion of the secondary amino group in the terminal N-cyclohexylaminomethyl radicals to urea groups significantly decreases the reactivity of the sealants resulting in increased skin-over-times and tack-free-times. Therefore in case a longer processability of the sealants is preferred and high-speed curing is not desired or of priority, the environmentally advantageous sealants of the present invention can be customized to the need of the skilled worker in the field of sealants.

Although the description and examples above contain many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An α-silyl terminated polydiorganosiloxane having the following general formula (I):

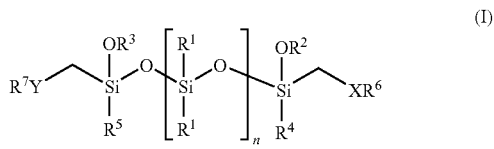

(I)

wherein the radicals $R^1$ are selected from the group consisting of straight-chain aliphatic radicals, branched aliphatic radicals, cycloaliphatic radicals, aryl radicals, and aralkyl radicals, each radical $R^1$ containing 1 to 12 carbon atoms and optionally one or more heteroatoms and optionally being substituted with halogen, the radicals $R^1$ being identical or different within the polydiorganosiloxane;

the radicals $R^2$ and $R^3$, which are identical or different, are selected from the group consisting of straight-chain aliphatic radicals and branched aliphatic radicals;

the radicals $R^4$ and $R^5$, which are identical or different, are selected from the group consisting of straight-chain aliphatic radicals, branched aliphatic radicals, $OR^2$ and $OR^3$, wherein $R^2$ and $R^3$ are defined as above;

the radicals X and Y, which are identical or different, are selected from the group consisting of O, S, $PR^8$ and NH, wherein $R^8$ is selected from the group consisting of H, —(C=O)NH—$R^9$, —(C=O)—$R^9$ and —(SO$_2$)—$R^9$, wherein $R^9$ is selected from the group consisting of aliphatic radicals, cycloaliphatic radicals, and aryl radicals, each radical $R^9$ containing 1 to 12 carbon atoms and optionally containing one or more heteroatoms;

the radicals $R^6$ and $R^7$, which are identical or different, are selected from the group consisting of straight-chain aliphatic radicals with 1 to 12 carbon atoms, branched aliphatic radicals with 1 to 12 carbon atoms, 5-membered and 6-membered cycloalkyl radicals containing one or more heteroatoms and optionally containing one or more double bounds, aryl radicals, aryl radicals containing one or more heteroatoms, =C=O, and (C=O) $R^{10}$, wherein $R^{10}$ is selected from the group consisting of Z—$R^{11}$, wherein Z is selected from the group consisting of S, O, $PR^8$ and NH and $R^{11}$ is selected from the group consisting of straight chain aliphatic radicals with 1 to 12 carbon atoms and branched aliphatic radicals with 1 to 12 carbon atoms;

n is from 10 to 10000; and salts obtained by reaction of said polydiorganosiloxane with organic or inorganic acid, and products obtained by quaternization reaction of said polydiorganosiloxane.

2. The α-silyl terminated polydiorganosiloxane of claim 1, wherein the radicals $R^1$ are selected from the group consisting of straight-chain alkyl radicals with 1 to 8 carbon atoms wherein optionally one or more halogen atoms are substituted for hydrogen atoms, branched alkyl radicals with 1 to 8 carbon atoms wherein optionally one or more halogen atoms are substituted for hydrogen atoms, 5-membered and 6-membered aryl radicals optionally containing one or more heteroatoms and wherein optionally one or more halogen atoms are substituted for hydrogen atoms, the radicals $R^1$ being identical or different within the polydiorganosiloxane.

3. The α-silyl terminated polydiorganosiloxane of claim 1, wherein the radicals $R^2$ and $R^3$, which are identical or different, are selected from the group consisting of straight-chain and branched alkyl radicals with 1 to 8 carbon atoms.

4. The α-silyl terminated polydiorganosiloxane of claim 1, wherein the radicals $R^4$ and $R^5$, which are identical or different, are selected from the group consisting of straight-chain and branched alkyl radicals with 1 to 8 carbon atoms, $OR^2$ and $OR^3$, wherein $R^2$ and $R^3$ are identical or different and are selected from the group consisting of straight-chain and branched alkyl radicals with 1 to 8 carbon atoms.

5. The α-silyl terminated polydiorganosiloxane of claim 1, wherein the radicals X and Y, which are identical or different, are selected from the group consisting of O, S, $PR^8$ and NH, wherein $R^8$ is selected from the group consisting of H, —(C=O)NH—$R^9$, —(C=O)—$R^9$ and —(SO$_2$)—$R^9$, wherein $R^9$ is selected from the group consisting of alkyl and cycloalkyl radicals with 1 to 8 carbon atoms and 5-membered or and 6-membered aryl radical optionally containing one or more heteroatoms.

6. The α-silyl terminated polydiorganosiloxane of claim 1, wherein the radicals $R^6$ and $R^7$, which are the same or different, are selected from the group consisting of straight-chain and branched alkyl radicals with 1 to 8 carbon atoms, 5-membered and 6-membered aryl radicals, optionally containing one or more heteroatoms, and =C=O.

7. The α-silyl terminated polydiorganosiloxane of claim 1, wherein n is between 10 and 10000 and selected to provide the α-silyl terminated polydiorganosiloxane with a viscosity of 1,000 to 900,000 mPa·s (according to Brookfield: Brookfield RVT, 23° C., Spindle No. 7, 2.5 rpm).

8. The α-silyl terminated polydiorganosiloxane of claim 1, wherein at least one of the radical X and radical Y is NH.

9. An α-silyl terminated polydiorganosiloxane having the following general formula (I):

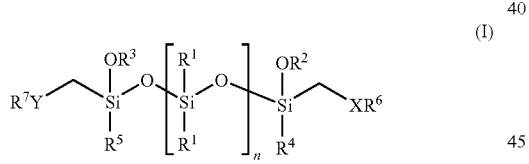

(I)

wherein the radicals $R^1$ are selected from the group consisting of straight-chain aliphatic radicals, branched aliphatic radicals, cycloaliphatic radicals, aryl radicals, and aralkyl radicals, each radical $R^1$ containing 1 to 12 carbon atoms and optionally one or more heteroatoms and optionally being substituted with halogen, the radicals $R^1$ being identical or different within the polydiorganosiloxane;

the radicals $R^2$ and $R^3$, which are identical or different, are selected from the group consisting of straight-chain aliphatic radicals and branched aliphatic radicals;

the radicals $R^4$ and $R^5$, which are identical or different, are selected from the group consisting of straight-chain aliphatic radicals, branched aliphatic radicals, $OR^2$ and $OR^3$, wherein $R^2$ and $R^3$ are defined as above;

the radicals X and Y which are identical or different, are selected from the group consisting of O, S, $PR^8$ and NH, wherein $R^8$ is selected from the group consisting of H, —(C=O)NH—$R^9$, —(C=O)—$R^9$ and —(SO$_2$)—$R^9$, wherein $R^9$ is selected from the group consisting of aliphatic radicals, cycloaliphatic radicals, and aryl radicals, each radical $R^9$ containing 1 to 12 carbon atoms and optionally containing one or more heteroatoms;

the radicals $R^6$ and $R^7$, which are identical or different, are selected from the group consisting of straight-chain aliphatic radicals with 1 to 12 carbon atoms, branched aliphatic radicals with 1 to 12 carbon atoms, cycloaliphatic radicals, cycloaliphatic radicals containing one or more heteroatoms, aryl radicals, aryl radicals containing one or more heteroatoms, =C=O, and (C=O)$R^{10}$, wherein $R^{10}$ is selected from the group consisting of Z—$R^{11}$, wherein Z is selected from the group consisting of S, O, $PR^8$ and NH and $R^{11}$ is selected from the group consisting of straight chain aliphatic radicals with 1 to 12 carbon atoms and branched aliphatic radicals with 1 to 12 carbon atoms;

n is from 10 to 10000; and salts obtained by reaction of said polydiorganosiloxane with organic or inorganic acid, and products obtained by quaternization reaction of said polydiorganosiloxane, wherein the radical X is NH and wherein said NH radical is further reacted with one or more quaternization reagents selected from the group consisting of alkyl halides or wherein said NH radical is further reacted with one or more inorganic acids or organic acids selected from the group consisting of sulfuric acid, hydrochloric acid, benzoic acid, terephthalic acid, phthalic acid, caproic acid, stearic acid, ascorbic acid and tartaric acid.

\* \* \* \* \*